Patented May 3, 1938

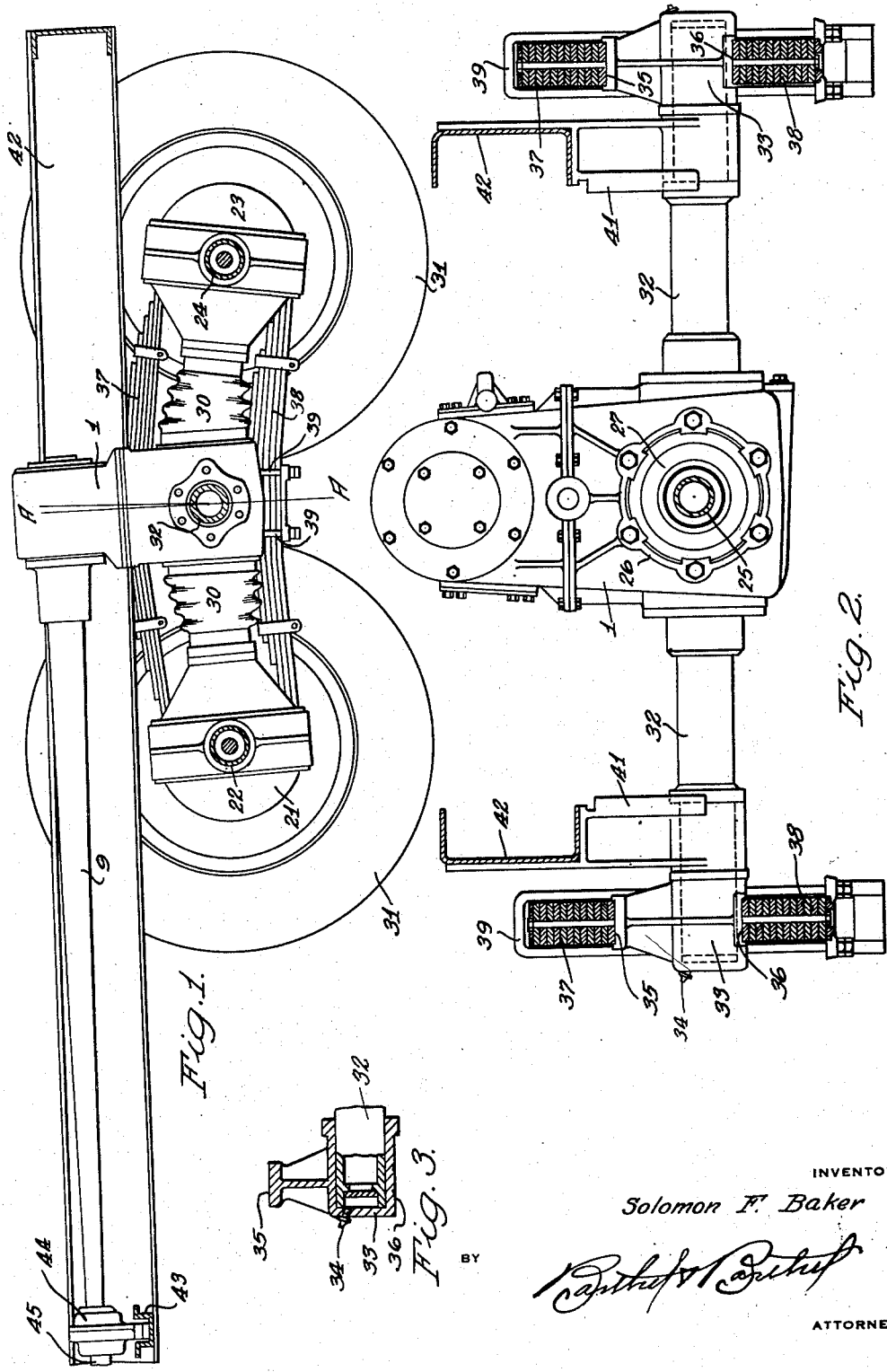

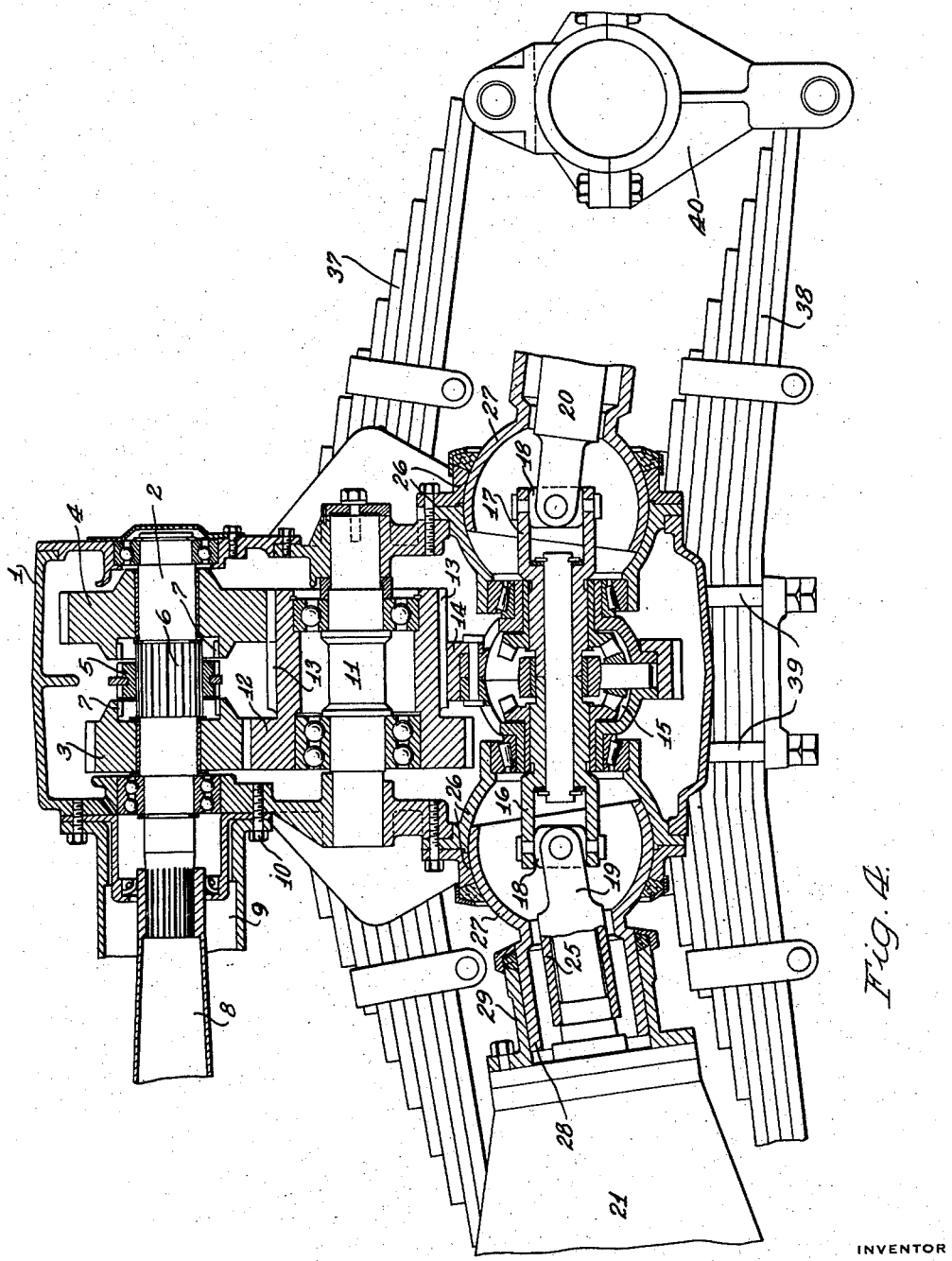

2,116,484

UNITED STATES PATENT OFFICE 2,116,484

TANDEM AXLE UNIT AND SUSPENSION THEREFOR

Solomon F. Baker, Detroit, Mich., assignor to Patent Developers, Inc., Detroit, Mich., a corporation of Michigan Application May 25, 1936, Serial No. 81,663

10 Claims. (Cl. 180—22)

This invention relates to dual rear axle drive units for motor vehicles of the type wherein both of the axles are driven through universal joints from a change speed transmission located therebetween.

In an arrangement of the type herein contemplated the vehicle propeller shaft is angularly disposed with respect to its driving and driven members; the position of the rear transmission housing varies vertically relative to the shafts which drive the axles; and the positions of the axles may vary both with respect to the transmission housing and with respect to each other. A primary object of this invention is to arrange the various parts of a unit of this character in such manner that the several universal joints will share the necessary angularities in a degree which will prolong the life of the entire unit and relieve strains heretofore considered inherent in a device of this type.

Another object is to provide an axle assembly suspension so correlated with the short shafts leading from the transmission that the universal joints are called upon to assume only such angularities as may be practical with conventional type joints.

Another object is to provide a spring suspension and main frame relation such that the predetermined maximum universal joint angularities cannot be exceeded during normal usage throughout the range of empty to fully loaded body conditions.

More particularly it is among the objects to provide a vehicle chassis including a frame with a propeller shaft residing angularly thereto, to rigidly connect a transmission housing on the frame, the housing being tilted to meet the propeller shaft thus tilting the final short drive shafts and their universal joint yokes, and to then provide a spring suspension which will assure these joints of the most favorable working conditions while precluding the possibility of the imposition of angularities on the joints beyond the limits for which they are designed.

Due to the fact that the transmission housing is carried by the vehicle frame, being rigid therewith, and due to the fact that the frame changes angularity with respect to the roadway in accord with the loading and consequent deflection of the main vehicle springs, the initial or unloaded relation of the housing will also change with changes in the load on the vehicle. In other words, the rear vehicle springs will deflect more than the front springs with the result that the frame may be said to rotate about an unknown, changing center well in front of the vehicle, and the transmission housing will tend to assume an exactly vertical position thus altering the angularities of the universal joints of the short shafts. The tendency will be that one of these joints will be favored by such movement while the other will be adversely affected. It is another object of this invention to provide an arrangement such that the rear axle will be actually favored by this housing movement and to so correlate the maximum rear spring deflections with the ground relation of the frame that the frame normally does not assume a horizontal position. The result will be that the front axle universal joint will not suffer by this tilting of the housing because the elevation of the frame thereabove will be less than the elevation of the frame immediately above the rear axle and will limit by contact therewith upward movement of the front axle to an amount such as will not impose an excessive angularity on the forward joint. This will be hereinafter more fully dealt with in explaining the possible rotation of the dual rear springs about their trunnion supports.

A further object is to provide an improved trunnion bearing member for the dual springs which will not only serve as a trunnion cap but also lend itself for use as a lubricant reservoir for preserving the life of each trunnion.

Another object is to provide an improved spring bracket and trunnion cap relation such that these parts will properly align themselves with respect to each other and assembly and disassembly of the springs on and off the trunnions will be materially simplified. As will appear, release of the means holding the spring brackets in place on the axle housing is all that is required for removal of the dual springs, brackets and trunnion caps as a unit.

Other objects and advantages will become more fully apparent hereinafter as reference is had to the accompanying drawings wherein one embodiment of the invention is illustrated and in which Fig. 1 is a side elevation of a dual axle driving assembly mounted on a vehicle frame in accordance with the invention;

Fig. 2 is a vertical section thereof taken substantially on the line A—A of Fig. 1;

Fig. 3 is a fragmental section through a trunnion and trunnion bearing member; and Fig. 4 is a vertical section of the transmission housing and gearing contained therein.

Like characters of reference are employed throughout to designate corresponding parts.

Referring more particularly to Fig. 4, the numeral 1 designates a transmission casing having a shaft 2 rotatably journalled therein. Supported by the shaft 2, in such manner that they may rotate freely with respect thereto, are two gears 3 and 4 and an externally toothed clutch element 5 is slidably mounted on the splined portion 6 of the shaft 2. The clutch element 5 is thus located between the gears 3 and 4 and is adapted to be moved into engagement with the clutch portions 7 on the gears 3 and 4 to selectively connect them with the shaft 2. The shaft 2 is connected to a propeller shaft 8 which is adapted to be driven by the motor of a vehicle in the manner well known in the art and therefore not illustrated here. The propeller shaft 8 is enclosed in a torque tube 9 having its end rigidly secured to the casing 1 by bolts 10.

Supported in the casing 1 is a shaft 11 rotatably supporting gears 12 and 13. The gears 12 and 13 are formed integral and of different diameters and are in constant mesh with the gears 3 and 4, respectively, and the gear 13 is in constant mesh with a ring gear 14 of a differential gearing arrangement generally designated 15. Universal knuckle members 16 and 17 extend from opposite sides of the differential gear and are connected through universal joint cross members 18 to short shafts 19 and 20. The short shaft 19 extends to a differential gear (not shown) in the housing 21 in the front axle 22 of the dual axle arrangement, and the short shaft 20 extends to a differential gear (not shown) in the housing 23 of the rear axle 24 of the dual axle arrangement. Each shaft includes in the length thereof a telescoping splined connection as illustrated at 25 in Fig. 4.

Each universal joint in the short shafts 19 and 20 is enclosed in a two part ball housing, the part 26 of each ball housing being rigid with respect to the casing 1, and the part 27 of each housing being universally movable in the part 26 and having a tubular extension 28 slidable and rotatable in a tubular bearing 29 on the differential housing 21 or 23 as the case may be. As illustrated in Fig. 1, the exposed portions of the parts 27 and 28 may be protected from the elements, dust, etc., by flexible, skirt-like seals 30 each having one of its ends secured to the bearing member 29 and its other end secured adjacent the housing 1. Ground engaging wheels 31 are mounted on the ends of the axles 22 and 24.

Fixed to the sides of the casing 1 in the lower portion thereof and extending laterally therefrom are trunnions 32, the axes of said trunnions lying in substantially the same horizontal plane with the centers of universal joints 16 and 17. The trunnions are also so located that under normal full load conditions their axes lie substantially in the same plane with the axes of the axles. A trunnion bearing member 33 encompasses the outer end of each trunnion 32, being closed over the end thereof to form a trunnion cap. This member 33 readily lends itself as a container for lubricant introduced through the fitting 34 and by virtue of its rocking movements serves as a lubricating means for the trunnion.

The trunnion bearing members 33 each have parallel upper and lower surfaces 35 and 36 for contact, respectively, by the lower surface of a spring 37 and the upper surface of a spring 38. U-bolts 39 fore and aft of the trunnion bearing encompass both springs 37 and 38 and retain the springs in fixed assembly with respect to each member 33. Brackets, such as shown at 40 in Fig. 4, connect the ends of the springs 37 and 38.

The brackets 40 have openings transversely therethrough for reception of the axle housings 22 and 24 and are capable of rotational movement relative to said housings, the axes of the openings being closer to the upper spring 37 than to the lower spring 38. By virtue of the two part construction of the brackets 40 shown in Fig. 4, each entire assembly of springs, brackets and trunnion bearing member may be removed as a unit by simply removing the bolts or other means by which the two parts of each bracket are normally held together around the axle housing. The bearing of the member 33 is below its center so that the axes of the trunnions 32 are closer to the top of the spring 38 than to the bottom of the spring 37.

The outer ends of the trunnions 32 pass through suitable bearings formed in the lower ends of a pair of frame brackets or supporting members 41 the upper portions of which are secured to the vehicle frame 42. The height of the brackets or supporting members 41 is suitably such that the casing 1 projects upwardly through the frame but without contact therewith. The casing 1 is thus supported solely by the trunnions 32. The torque tube 9 extends from its point of connection near the top of the casing 1 to a point of attachment remote therefrom, located on the frame cross member 43. The propeller shaft 8, within the torque tube 9, is connected by a universal joint (not shown) within the housing 44 to a drive shaft 45. As previously indicated, the propeller shaft 8 resides at a small angle with respect to the plane of the vehicle frame 42 and thereby subjects the universal joint within housing 44 to a slight angularity.

In its unloaded state, the frame 42 is supported by the springs 37 and 38 in a position at an angle to a horizontal plane with the rear end of the frame higher than the front end. The casing 1, being fixed to the frame, is held in a position with its center line A—A tilted forward, that is, it is at an angle to a vertical plane, and the universal joints in the short shafts, being symmetrically arranged with respect to the casing, are likewise tilted. The axes of the axles 22 and 24, however, under normal conditions reside in the same horizontal plane and therefore different angularities are imposed upon the universal joints in the short shafts. The universal joint to the rear of the casing 1 has a greater angularity than the universal joint at the forward side of the casing 1. The tilting forward of the casing 1 also results in decreasing the angularity imposed on the universal joint in the propeller shaft within housing 44.

The springs 37 and 38 are supported by the bearing members 33 in such manner that they may rotate bodily around the trunnions 32 while the brackets 40 may rotate around the axle housings, and as the vehicle load increases the springs deflect in such manner that the vehicle frame moves nearer a horizontal plane without setting up any torsional stresses. The capacity of the springs to withstand deflection is such that under full load conditions the tilting of the housing decreases so that the line A—A becomes vertical or nearly so, but does not pass the vertical to tilt in a reverse direction. During the lessening of the tilting angle of the casing 1 the universal joint to the rear of the casing 1 will be favored inasmuch as the angular relationship of the parts 17 and 20 more nearly approaches a straight line. The lowering of the frame and casing under increased loads also reduces the angularity of the forward universal joint in such a manner that under maximum static load conditions the angularity of said joint preferably becomes zero or slightly negative. Under these same load conditions, however, the rear joint retains a positive angularity, although the difference between the angularities of the two joints is less at full load than when the frame is unloaded.

As previously indicated, the frame itself serves as a stop means for positively preventing upward movement of the axles to such extents as would impose angularities on the universal joints in excess of the maximum at which they are designed for operation. If necessary or desired, individual spacer or stop members may be provided for this purpose, particularly should the forward tilt of the frame be such that maximum elevation of the rear axle would impose an excessive angularity on the forward joint.

Although one specific construction embodying the invention has been described and illustrated in the drawings, it will be obvious that the invention is not limited to this particular embodiment but is susceptible of various changes in the form, details of construction and arrangement of the parts without departure from the inventive concept. Reference is therefore to be had to the appended claims for a definition of the limits of the invention.

What is claimed is:

1. In a vehicle having dual rear axles, a frame, springs supporting said frame upon the axles, a train of gearing, a housing for said gearing suspended from said frame in substantially upright position between the axles, and short shafts each having a universal joint interposed in the length thereof for driving said axles from said gearing, said housing being so connected to said frame that in unloaded condition of the latter said housing is inclined with respect to the vertical thereby imposing relatively different angularities on said universal joints.

2. In a vehicle having dual rear axles, a frame resiliently supported with respect to said axles, a transmission and housing therefor suspended from said frame between the axles, and short shafts each having a universal joint interposed in the length thereof for driving said axles from said transmission, said housing being so connected to said frame as to have an upright tilted position forming an angle with the vertical when the frame of the vehicle is unloaded thereby subjecting the joints to different angularities, said housing decreasing its angularity with the vertical during depression of said frame under increased loading thereby decreasing the difference between the angularities of said joints.

3. In a vehicle having dual rear axles, a frame, springs supporting said frame from the axles, a change speed transmission and housing therefor suspended from said frame between said axles, and short shafts each having a universal joint interposed in the length thereof for driving said axles from said transmission, said housing being so connected to said frame as to have an initial forward angularity with respect to the vertical when the frame of the vehicle is unloaded thereby subjecting the front one of said universal joints to less initial angularity than the rear one of said joints, said springs having resistance characteristics such that under maximum static loads the rear one of said joints will retain a positive angularity and the angularity of the front one of said joints will reach zero or a slight negative value.

4. In a vehicle having two rear axles, a main frame, springs for supporting said frame from the axles, a transmission and housing therefor residing between said axles and having shafts including universal joints extending therefrom to drive each of said axles, brackets carried by said frame, cylindrical members extending laterally from opposite sides of said housing for support in said brackets, said members being rigidly secured to said housing approximately at the level of said universal joints and extending through and outwardly beyond said brackets to constitute trunnion supports for said springs.

5. In a vehicle having dual rear axles, a main frame, trunnions rigidly secured to said frame and extending laterally from opposite sides thereof, trunnion caps on said trunnions having upper and lower spring receiving faces, springs contacting each of said faces and each extending fore and aft of said trunnions for attachment at each end to one of said axles, said springs and axles being rockable about said trunnions, said main frame being supported in a forwardly inclined position with respect to the horizontal in unloaded and also, to a lesser degree, in fully loaded condition and constituting means for limiting the upward deflection of the front axle during such rocking movements to an amount less than the possible upward deflection of the rear axle during opposite rocking movement.

6. In a vehicle having dual rear axles, a main frame, a transmission and housing therefor residing between said axles, drive shafts each having a universal joint in the length thereof extending from said transmission to each of said axles, brackets on said frame, rigid members extending from said housing past said brackets for rigid attachment thereto, the outer ends of said members constituting trunnions, a cap for each of said trunnions having upper and lower spring receiving faces, springs seated on said faces and extending fore and aft of said trunnions for attachment to said axles, said caps, springs and axles being rockable about said trunnions thereby imposing various angularities on said universal joints, said housing being tilted forwardly thereby reducing the possible upward deflection of the front universal joint and increasing the possible upward deflection of the rear universal joint, said frame being inclined downwardly at its front end and constituting a stop for limiting the upward deflection of said front universal joint to a predetermined safe degree.

7. In a vehicle, in combination, a frame, dual axles for the rear wheels thereof, sets of springs connected to said axles at the ends of the latter and located outwardly beyond the sides of said frame, trunnions extending laterally beyond the sides of said frame, a journal member separating the springs of each of said sets at the midpoints thereof, said journal members constituting means for supporting said trunnions from said springs and being closed at their outer ends to form caps for said trunnions, means for supplying lubricant to the interior of said journal members to provide lubrication for the rocking movements thereof on said trunnions, and straps encompassing the springs of each of said sets for holding said springs and the associated journal member in rigid assembly.

8. In a spring assembly for dual rear axles, a pair of leaf springs, a member having upper and lower parallel surfaces in contact with said springs and serving as a spacing means therebetween, means for rigidly securing said springs to said member, said member having a hollow portion facing laterally of and located between said springs and constituting a bearing, said bearing being immediately adjacent the top of the lower one of said pair of springs and substantially spaced from the bottom of the top one of said pair of springs.

9. In a spring assembly for dual rear axles, two pairs of leaf springs spaced apart and joined together at their outer ends by brackets, a trunnion bearing member to which the springs of each of said pairs are secured at the mid-points thereof having parallel upper and lower surfaces against which said springs contact, said brackets having openings transversely therethrough for the axles, said bearing members each having an opening constituting a bearing for a trunnion, the axes of said axle receiving openings through said brackets being closer to the upper than to the lower springs of said pairs, and the axes of said trunnion receiving openings in said trunnion bearing members being closer to the top of the lower springs than to the bottom of the upper springs of said pairs.

10. A spring assembly as set forth in claim 8 including straps encompassing said springs immediately fore and aft of said bearing member and a pair of axle receiving brackets connecting the adjacent ends of said springs, whereby a set of springs together with said brackets and said bearing member constitutes a single unit of assembly.

SOLOMON F. BAKER.